US012035120B2

(12) United States Patent
Cai et al.

(10) Patent No.: US 12,035,120 B2
(45) Date of Patent: Jul. 9, 2024

(54) DIAPHRAGM AND LOUDSPEAKER

(71) Applicant: GOERTEK INC., Shandong (CN)

(72) Inventors: Xiaodong Cai, Shandong (CN); Ting Wang, Shandong (CN)

(73) Assignee: GOERTEK INC., Weifang (CN)

( * ) Notice: Subject to any disclaimer, the term of this patent is extended or adjusted under 35 U.S.C. 154(b) by 190 days.

(21) Appl. No.: 17/758,992

(22) PCT Filed: Nov. 17, 2020

(86) PCT No.: PCT/CN2020/129431
§ 371 (c)(1),
(2) Date: Jul. 18, 2022

(87) PCT Pub. No.: WO2021/147492
PCT Pub. Date: Jul. 29, 2021

(65) Prior Publication Data

US 2023/0034424 A1 Feb. 2, 2023

(30) Foreign Application Priority Data

Jan. 21, 2020 (CN) ......................... 202010073802.0

(51) Int. Cl.
*H04R 7/02* (2006.01)
*H04R 1/02* (2006.01)

(52) U.S. Cl.
CPC ................. *H04R 7/02* (2013.01); *H04R 1/02* (2013.01); *H04R 2307/00* (2013.01)

(58) Field of Classification Search
CPC ......... H04R 7/02; H04R 1/02; H04R 2307/00
See application file for complete search history.

(56) References Cited

U.S. PATENT DOCUMENTS

2002/0140136 A1 10/2002 Ishigaki et al.
2014/0161293 A1 6/2014 Wang et al.
(Continued)

FOREIGN PATENT DOCUMENTS

CN 201039420 Y 3/2008
CN 101426165 A 5/2009
(Continued)

OTHER PUBLICATIONS

International Search Report from International Application No. PCT/CN2020/129431 mailed on Feb. 20, 2021.

*Primary Examiner* — Andrew L Sniezek
(74) *Attorney, Agent, or Firm* — Shih IP Law Group, PLLC

(57) ABSTRACT

Provided in the present disclosure is a diaphragm, comprising a diaphragm body, wherein the diaphragm body comprises a fixing portion at an outer side, a bendable ring portion provided protruding from an inner ring side of the fixing portion and elastically bendable, and an inner side portion at an inner ring side of the bendable ring portion, the diaphragm body is made of a waterproof and breathable material having waterproof and breathable micropores. According to the present disclosure, the diaphragm body is made of waterproof and breathable material having waterproof and breathable micropores so that the diaphragm body has micropores, and the sizes of the micropores are between the size of water molecules and the size of air molecules, such that air molecules can smoothly pass through the diaphragm, while the water molecules can be effectively prevented from passing therethrough.

12 Claims, 2 Drawing Sheets

(56) References Cited

U.S. PATENT DOCUMENTS

| | | | | |
|---|---|---|---|---|
| 2015/0163572 | A1 | 6/2015 | Weiss et al. | |
| 2020/0053470 | A1* | 2/2020 | Gu | H04R 1/2811 |

FOREIGN PATENT DOCUMENTS

| | | | |
|---|---|---|---|
| CN | 202918485 | U | 5/2013 |
| CN | 103873993 | A | 6/2014 |
| CN | 105101038 | A | 11/2015 |
| CN | 105594225 | A | 5/2016 |
| CN | 208874727 | U | 5/2019 |
| CN | 209390362 | U | 9/2019 |
| CN | 111225321 | A | 6/2020 |

* cited by examiner

DIAPHRAGM AND LOUDSPEAKER

TECHNICAL FIELD

The present disclosure relates to a technical field of electro-acoustic conversion, in particular to a diaphragm, and a loudspeaker having the same.

BACKGROUND ART

At present, electronic devices such as smart phones and smart tablets need to have dust-proof and waterproof functions due to daily using environment thereof. Among them, waterproof function is more important for wearable devices. For example, when a user wears a smart watch to swim, dive, shower, etc., a higher level of waterproof is required for the devices.

Due to the waterproof functions of electronic devices, it requires electronic devices to have good sealing in design and assembly, otherwise there will be potential danger of water ingress. However, due to the heat generated by electronic circuits and chips during operation, the air may expand in a confined space of the devices, and since an acoustic cavity of the loudspeaker is communicated with the whole internal space of the device, the expanded air may affect the operation of the loudspeaker and may result in problems such as low sound volume and noise. For reducing the air pressure and waterproofing, in the prior art, vent holes are provided on the diaphragm, and a waterproof net is adhered thereon to cover the vent holes, but the additionally provided waterproof net is easily peeled off, and may also affect the sound generation performance of the diaphragm.

SUMMARY

An object of the present disclosure is to provide a diaphragm, which aims to solve the above technical problems.

In order to achieve the above object, the present disclosure provides a diaphragm for a loudspeaker, the diaphragm includes a diaphragm body, and the diaphragm body includes a fixing portion at an outer side, a bendable ring portion provided protruding from an inner ring side of the fixing portion and elastically bendable, and an inner side portion at an inner ring side of the bendable ring portion, the diaphragm body is made of a waterproof and breathable material having waterproof and breathable micropores.

In an embodiment, the diaphragm further includes a rigid vibration plate coupled to an inner side portion of the diaphragm body.

In an embodiment, an engraved hole is provided on the inner side portion, and the vibration plate covers the engraved hole.

In an embodiment, sizes of the waterproof and breathable micropores are in a range of 0.35 to 0.4 nm.

In an embodiment, an air permeability of the waterproof and breathable material is less than 0.04 $cm^3/cm^2/sec$ at 125 Pa; or, the air permeability of the waterproof and breathable material is less than 2.2 $cc/cm^2/sec$ at 1 psi.

In an embodiment, a water pressure tolerance of the waterproof and breathable material is in a range of 100 mm-50000 mm $H_2O$.

In an embodiment, the waterproof and breathable material is a polymer film.

In an embodiment, an elastic modulus of the polymer film is in a range of 10 to 500 Mpa.

In an embodiment, a thickness of the diaphragm body is in a range of 30 to 120 μm.

In an embodiment, the polymer film includes a film made of any one of polyurethane material, polyester elastomer material, polyamide elastomer material, polyimide material, polytetrafluoroethylene material, polycarbonate material, polyethylene terephthalate material, polyvinylidene fluoride material and polyethylene naphthalate material.

Further provided in the present disclosure is a loudspeaker, the loudspeaker including:

a housing; and the afore-mentioned diaphragm, the fixing portion of the diaphragm is coupled to the housing.

In an embodiment, the housing is made of a waterproof and breathable material having waterproof and breathable micropores.

According to the present disclosure, the diaphragm body is made of waterproof and breathable material having waterproof and breathable micropores, so that the diaphragm body has micropores, and the sizes of the micropores are between the size of water molecules and the size of air molecules, such that air molecules can smoothly pass through the diaphragm, while the water molecules can be effectively prevented from passing therethrough. Accordingly, the diaphragm is waterproof and breathable functions. Therefore, the internal air pressure can be substantially equal to the external air pressure of the loudspeaker, so that an air pressure balance between internal and external of the loudspeaker may be ensured, and the waterproof performance of the loudspeaker can also be improved. It may be understood that since the diaphragm itself formed having waterproof and breathable micropores, large vent holes can be avoided, and an additional waterproof net can be omitted, so that the sound generation performance of the diaphragm can be ensured.

BRIEF DESCRIPTION OF THE DRAWINGS

In order to explain the embodiments of the present disclosure or the technical solutions in the prior art more clearly, the accompanying drawings used in the description of the embodiments or the prior art will be briefly introduced in the following. Obviously, the accompanying drawings in the following description are only some embodiments of the present disclosure, and other drawings can also be obtained according to the structures shown in these drawings without any creative effort by those skilled in the art.

REFERENCE NUMERALS

100: diaphragm body; 110: fixing portion; 120: bendable ring portion; 130: inner side portion; 140: engraved hole; 200: housing; 300: voice coil; 400: magnetic circuit system.

The realization of the object, functional features and advantages of the present disclosure will be further described with reference to the accompanying drawings in conjunction with the embodiments.

DETAILED DESCRIPTION OF THE EMBODIMENTS

The technical solutions in the embodiments of the present disclosure will be clearly and completely described below with reference to the accompanying drawings in the embodiments of the invention. Obviously, the described embodiments are only part of the embodiments of the present disclosure, not all of the embodiments. Based on the embodiments of the present disclosure, all other embodiments obtained by those of ordinary skill in the art without creative work fall within the protection scope of the present disclosure.

It should be noted that if there are directional indications (such as up, down, left, right, front, rear, etc.) involved in the embodiments of the present disclosure, the directional indications are only used to explain the relative position relationship and motion between components in a specific attitude (as shown in the accompanying drawings), and if the specific attitude changes, the directional indication also changes accordingly.

In addition, if there are descriptions involving "first", "second", etc. in the embodiments of the present disclosure, the descriptions are only used for descriptive purposes, and should not be construed as indicating or implying its relative importance or implicitly indicating the number of indicated technical features. Thus, a feature defined with "first" and "second" may explicitly or implicitly include at least one of the features. In addition, the meaning of "and/or" in the full text is to include three parallel schemes. Taking "A and/or B" as an example, it includes a scheme A, a scheme B, or a scheme A and B. In addition, the technical solutions between various embodiments can be combined with each other, but must be based on the realization by those of ordinary skill in the art. When the combination of technical solutions is contradictory or impossible, it should be considered that the combination of such technical solutions does not exist and is not within the protection scope of the present disclosure.

Figure 1:
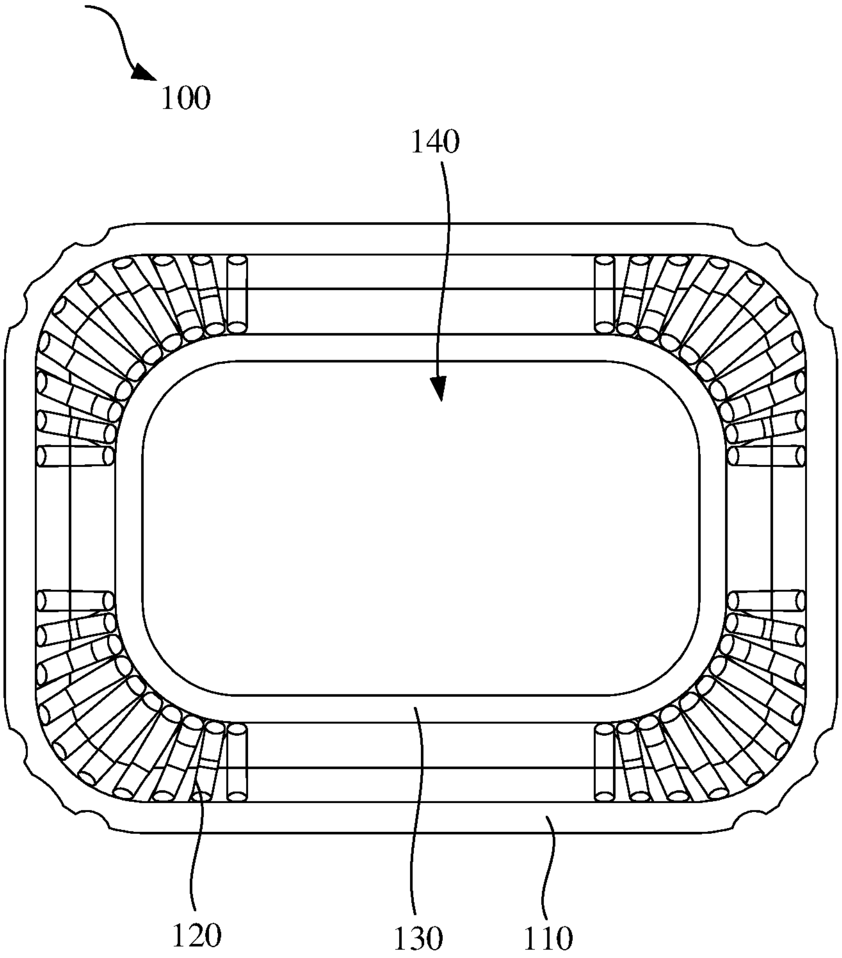
FIG. 1 is a schematic view illustrating a structure of a diaphragm according to an embodiment of the present disclosure.
Figure 2:
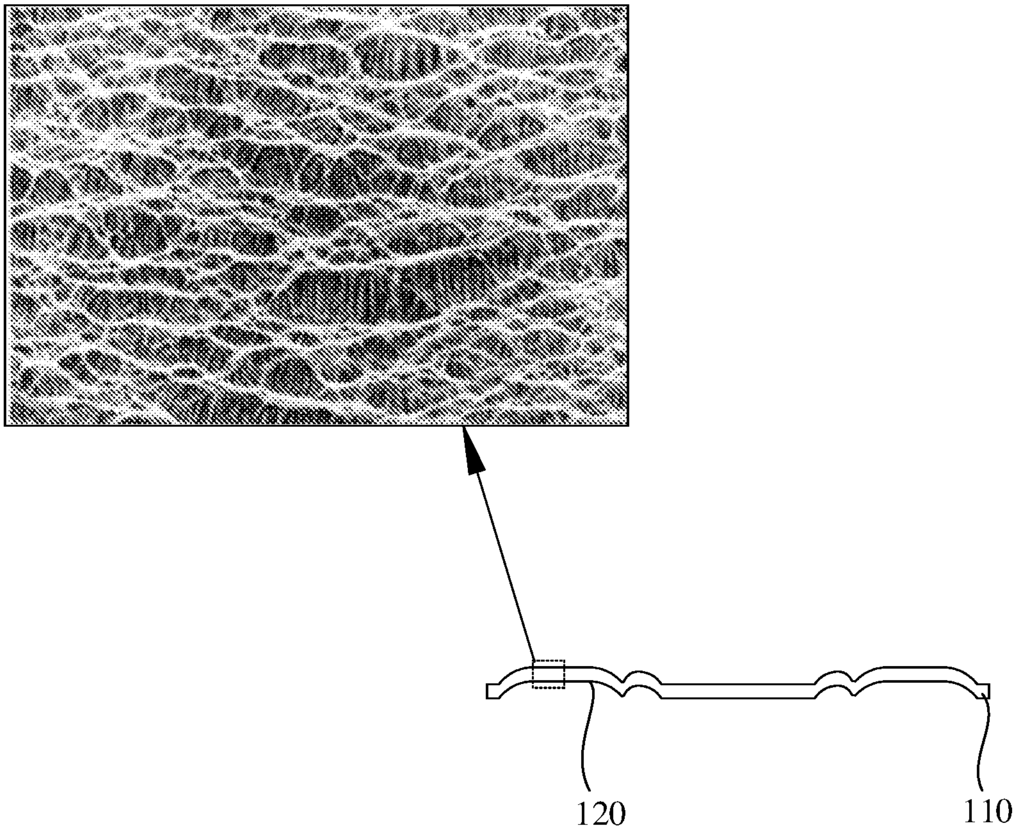
FIG. 2 is a schematic view illustrating a cross-section and a structure of micropores of the diaphragm shown in FIG. 1.

The present disclosure provides a diaphragm for a loudspeaker. The diaphragm according to an embodiment of the present disclosure will be described in detail below with reference to FIGS. 1 and 2.

According to an embodiment of the present disclosure, the diaphragm may include a diaphragm body 100, and the diaphragm body 100 may include a fixing portion 110 at an outer side thereof, a bendable ring portion 120 provided protruding from an inner ring side of the fixing portion 110 and elastically bendable, and an inner side portion 130 at an inner ring side of the bendable ring portion 120, the diaphragm body 100 may be made of a waterproof and breathable material having waterproof and breathable micropores.

It should be noted that the waterproof and breathable micropores refer to micropores that only allow air molecules to pass through, but not allow water molecules to pass through. Specifically, the waterproof and breathable material may be partially provided having waterproof and breathable micropores, or may be fully distributed having waterproof and breathable micropores. In the present disclosure, the specific number and specific arrangement positions of the waterproof and breathable micropores on the waterproof and breathable material is not limited. That is, they are not limited in the present disclosure as long as the diaphragm body 100 may be prepared to have waterproof and breathable micropores. It should also be noted that the waterproof and breathable material can be made of plastic, metal or synthetic fiber, and it is not limited in the present disclosure.

Due to the waterproof functions of electronic devices, it requires electronic devices to have good sealing in design and assembly, otherwise there will be potential danger of water ingress. However, due to the heat generated by electronic circuits and chips during operation, the air may expand in a confined space of the devices, and since an acoustic cavity of the loudspeaker is communicated with the whole internal space of the device, the expanded air may affect the operation of the loudspeaker and may result in problems such as low sound volume and noise. In addition, during the operation of the loudspeaker, the voice coil 300 may also generate heat, resulting in an expansion of the air in the acoustic cavity. For reducing the air pressure and waterproofing, in the prior art, vent holes may be provided on the diaphragm, and a waterproof net may be adhered thereon to cover the vent holes, but the additionally provided waterproof net may be easily peeled off, and may also affect the sound generation performance of the diaphragm. As for sophisticated loudspeakers, it may also increase the difficulty in manufacturing the loudspeaker.

According to the present disclosure, the diaphragm body 100 may be made of waterproof and breathable material having waterproof and breathable micropores so that the diaphragm body 100 has micropores, and the sizes of the micropores are between the size of water molecules and the size of air molecules, such that air molecules can easily pass through the diaphragm, while the water molecules can be effectively prevented from passing therethrough. Accordingly, the diaphragm is waterproof and breathable functions. Therefore, the internal air pressure can be substantially equal to the external air pressure of the loudspeaker, so that an air pressure balance between internal and external of the loudspeaker may be ensured, and the waterproof performance of the loudspeaker can also be improved. It may be understood that since the diaphragm itself formed having waterproof and breathable micropores, large vent holes can be avoided, and an additional waterproof net can be omitted, so that the sound generation performance of the diaphragm can be ensured.

In addition, the diaphragm may further include a rigid vibration plate coupled to the inner side portion 130 of the diaphragm body 100. In the embodiment, an engraved hole may be provided on the inner side portion, and the vibration plate may cover the engraved hole. In the embodiment, the vibration plate and the diaphragm body are made of different materials, the vibration plate and the diaphragm body are separately formed and then the vibration plate is coupled to the center of the diaphragm body. In other embodiments, the vibration plate can also be made of waterproof and breathable material, so that the diaphragm body 100 and the vibration plate can be integrally formed.

In addition, the waterproof and breathable material may be uniformly provided having waterproof and breathable micropores so that the diaphragm body 100 is also uniformly provided having waterproof and breathable micropores. It may be understood that by distributing the waterproof and breathable micropores throughout the diaphragm body 100, air molecules can easily pass through the diaphragm, so as to further improve the air permeability of the diaphragm, and at the same time ensure the waterproof function of the diaphragm, and accordingly, the internal air pressure may be further close to the external air pressure of the loudspeaker, so that an air pressure balance between internal and external of the loudspeaker may be further ensured.

In addition, sizes of the waterproof and breathable micropores may be in a range of 0.35 to 0.4 nm. The sizes of air molecules are generally in a range of 0.3 to 0.4 nm, and the sizes of water molecules are about 0.4 nm. It may be understood that air molecules are generally in a gas state, while water molecules mostly exist in a liquid state. That is, water molecules exist in a form of water droplets, and thus have a size much larger than 0.4 nm. So, it is generally impossible for the droplets to pass through micropores smaller than 0.4 nm. Therefore, in the embodiment, the size range of the waterproof and breathable micropores is further set to be between the sizes of air molecules and water molecules, which can greatly improve the waterproof performance of the diaphragm, while allow air molecules to pass through. Such special structure makes the diaphragm waterproof and breathable, and there is no need of additional holes and waterproof nets, which affect the sound generation performance of the diaphragm, and the process difficulty of the diaphragm is greatly reduced.

In addition, an air permeability of the waterproof and breathable material is less than 0.04 $cm^3/cm^2/sec$ at 125 Pa, or the air permeability of the waterproof and breathable material is less than 2.2 $cc/cm^2/sec$ at 1 psi. It may be understood that the air permeability of a material refers to a performance of the material through which air can pass through when there is a pressure difference between the two sides of the material, which can be expressed by permeability, i.e., the volume of air flowing through per unit area of the material per unit time under a specified pressure difference on both sides of the material. The air permeability of the waterproof and breathable material is related to the pore size and porosity of micropores, and the air permeability of the waterproof and breathable material should not be too large so as not to avoid affecting the sound generation performance of the diaphragm.

In addition, a water pressure tolerance of the waterproof and breathable material is in a range of 100 to 50000 mm $H_2O$. Among the electronic devices, waterproof performance requirements are stricter for wearable devices. For example, when a user wears a smart watch to swim, dive, shower, etc., a higher waterproof level, or even 50 meters waterproof level may be required. Therefore, the waterproof and breathable material used in the diaphragm also needs to have a certain water pressure resistance level, so as to avoid the rupture of the diaphragm when the water pressure increase.

In the embodiment, the waterproof and breathable material is a polymer film. It may be understood that when the diaphragm is made of polymer film material, the diaphragm may have a large number of waterproof and breathable micropores, while it can also meet the requirements of light weight and strong rigidity of the diaphragm. Specifically, an elastic modulus of the polymer film is in a range of 10 to 500 Mpa. The elastic modulus may be an index indicating the property of elastic deformation of the material, and the larger the value thereof, the greater the stress that causes the material to undergo a certain elastic deformation, i.e., the greater the rigidity of the material, i.e., the smaller the elastic deformation occurs under a certain stress. Since the diaphragm needs to have certain rigidity and elasticity at the same time, it is necessary to reasonably control the elastic modulus of the polymer film so as to improve the sound generation performance of the diaphragm. Optionally, a thickness of the polymer film is in a range of 30 to 120 μm. It may be understood that when the polymer film is too thick, the quality of the diaphragm may increase, and when the polymer film is too thin, the water pressure resistance may be reduced. Therefore, it is also necessary to control the thickness of the polymer film to be in a reasonable range.

The polymer film includes a film made of any one of polyurethane material (PU), polyester elastomer material, polyamide elastomer material (PA), polyimide material (PI), polytetrafluoroethylene (PTFE) material, polycarbonate material (PC), polyethylene terephthalate material (PET), polyvinylidene fluoride (PVDF) material and polyethylene naphthalate material (PEN).

Figure 3:
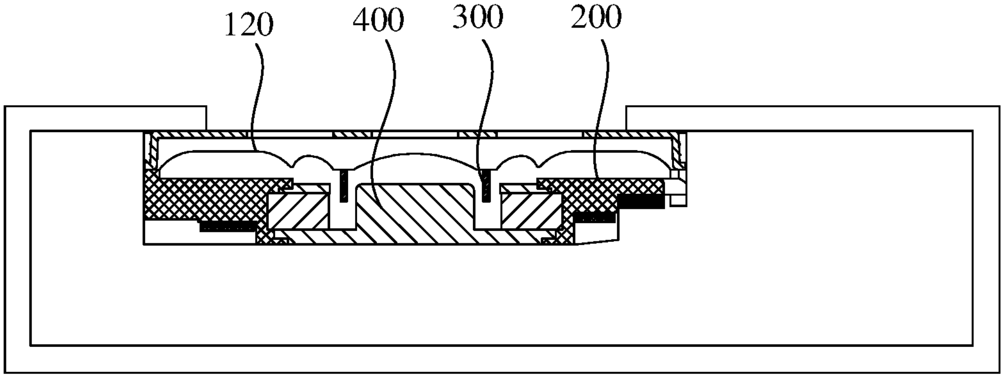
FIG. 3 is a schematic view illustrating a structure of a loudspeaker according to an embodiment of the present disclosure.

Further provided in the present disclosure is a loudspeaker. As shown in FIG. 3, the loudspeaker may include a housing 200, a diaphragm, a voice coil 300 a magnetic circuit system 400, etc. The fixing portion 110 of the diaphragm may be coupled to the housing 200, the voice coil 300 may be located between the diaphragm and the magnetic circuit system 400, and the voice coil 300 may be connected to the diaphragm. When a sound current signal is applied to the voice coil 300, the voice coil 300 vibrates and drives the diaphragm to vibrate to generate sound. The specific structure of the diaphragm refers to the above-mentioned embodiment. Since the loudspeaker adopts all the technical solutions of all the above-mentioned embodiments, it has at least all the beneficial effects brought by the technical solutions of the above-mentioned embodiments, which will not be repeatedly described herein.

Further, the housing 200 is at least partially provided having waterproof and breathable micropores, and optionally, the housing 200 is made of a waterproof and breathable material having waterproof and breathable micropores, so that the housing of the loudspeaker also has waterproof and breathable performances.

The above are only preferred embodiments of the present disclosure, and are not intended to limit the scope of the disclosure. In addition, the equivalent structure transformation made by using the contents of the description and drawings of the present disclosure, or the direct/indirect applications in other relevant technical fields, are included within the protection scope of the present disclosure.

What is claimed is:

1. A diaphragm for a loudspeaker, wherein the diaphragm comprises a diaphragm body, and the diaphragm body comprises a fixing portion at an outer side, a bendable ring portion provided protruding from an inner ring side of the fixing portion and elastically bendable, and an inner side portion at an inner ring side of the bendable ring portion, the diaphragm body is made of a waterproof and breathable material having waterproof and breathable micropores.

2. The diaphragm of claim 1, wherein the diaphragm further comprises a rigid vibration plate coupled to an inner side portion of the diaphragm body.

3. The diaphragm of claim 2, wherein an engraved hole is provided on the inner side portion, and the vibration plate covers the engraved hole.

4. The diaphragm of claim 1, wherein sizes of the waterproof and breathable micropores are in a range of 0.35 to 0.4 nm.

5. The diaphragm of claim 1, wherein an air permeability of the waterproof and breathable material is less than 0.04 $cm^3/cm^2/sec$ at 125 Pa, or the air permeability of the waterproof and breathable material is less than 2.2 $cc/cm^2/sec$ at 1 psi.

6. The diaphragm of claim 1, wherein a water pressure tolerance of the waterproof and breathable material is in a range of 100 to 50000 mm $H_2O$.

7. The diaphragm of claim 1, wherein the waterproof and breathable material is a polymer film.

8. The diaphragm of claim 7, wherein an elastic modulus of the polymer film is in a range of 10 to 500 Mpa.

9. The diaphragm of claim 7, wherein a thickness of the diaphragm body is in a range of 30 to 120 μm.

10. The diaphragm of claim 7, wherein the polymer film comprises a film made of any one of polyurethane material, polyester elastomer material, polyamide elastomer material, polyimide material, polytetrafluoroethylene material, polycarbonate material, polyethylene terephthalate material, polyvinylidene fluoride material and polyethylene naphthalate material.

11. A loudspeaker, wherein the loudspeaker comprises:

a housing; and the diaphragm of claim 1, the fixing portion of the diaphragm is coupled to the housing.

12. The loudspeaker of claim 11, wherein the housing is made of a waterproof and breathable material having waterproof and breathable micropores.

* * * * *